Aug. 28, 1945.   H. FRIEDMAN ET AL   2,383,478
RADIOGRAPHIC EXPOSURE METER
Filed Feb. 3, 1942   2 Sheets-Sheet 1
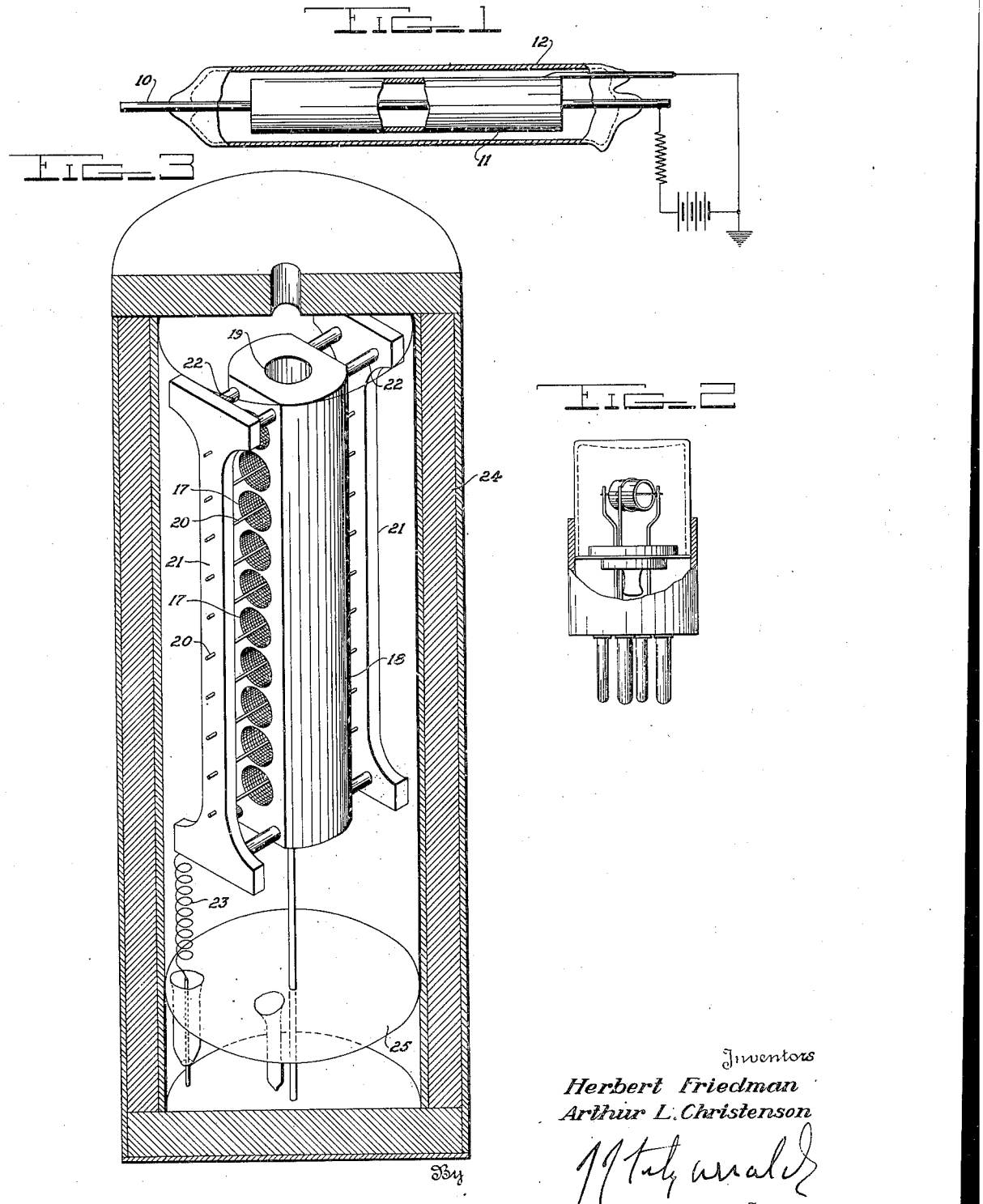
Inventors
Herbert Friedman
Arthur L. Christenson

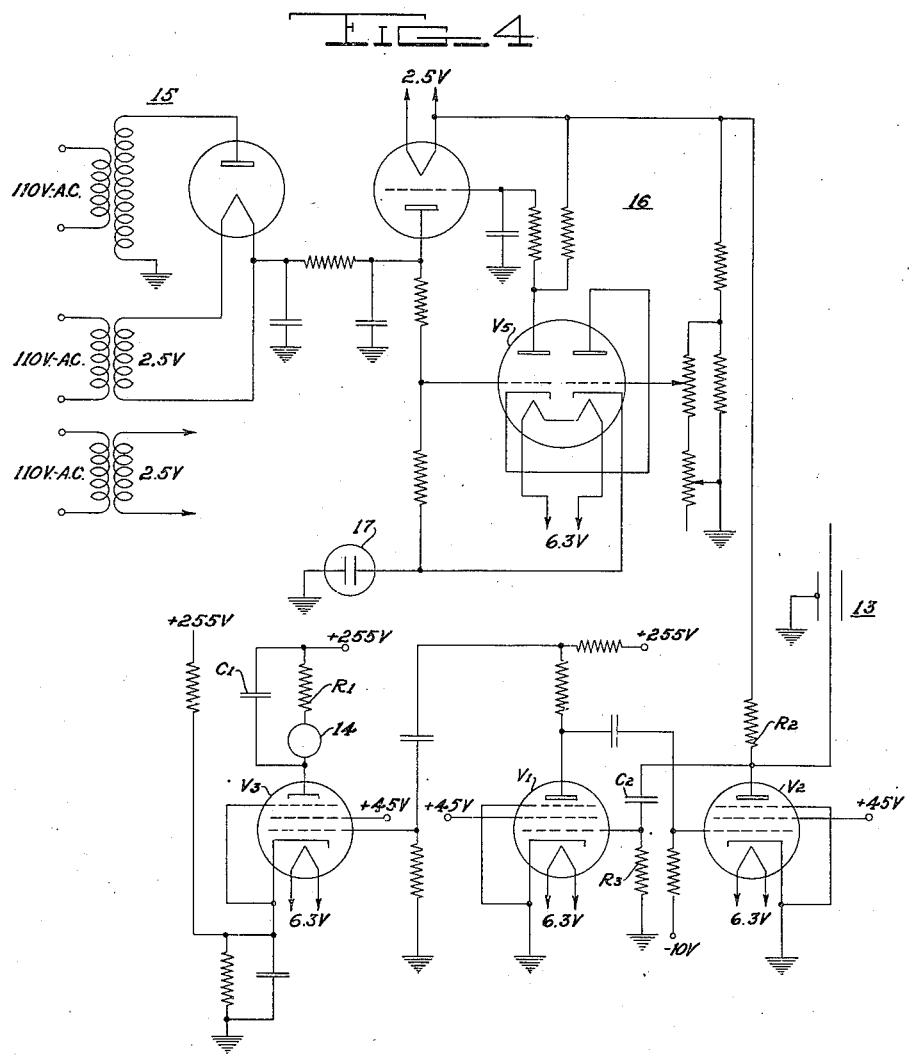

Patented Aug. 28, 1945

2,383,478

UNITED STATES PATENT OFFICE 2,383,478

RADIOGRAPHIC EXPOSURE METER

Herbert Friedman, Arlington, Va., and Arthur L. Christenson, Washington, D. C.

Application February 3, 1942, Serial No. 429,408

4 Claims. (Cl. 250—83.6)

(Granted under the act of March 3, 1883, as amended April 30, 1928; 370 O. G. 757)

This invention relates to an exposure meter for use in determining the correct exposure time in X-ray and gamma-ray photography.

To interpret radiographs properly it is essential that the photographic density be correct. It is general practice among radiographers to determine exposure times from the gamma-radiography slide rule and from standard technique charts from X-ray radiograph. When the specimen thickness is accurately known and the geometry of the photographic set-up is simple, the slide rule is a good guide in gamma-radiography. However, when the specimen is a casting of a complicated shape, the choice of exposure time is somewhat of a hit or miss procedure. An exposure meter that indicated intensity at the film position would eliminate all uncertainty in exposure timing and assure optimum density on every film. The present invention provides such a meter. For X-ray radiography the technique charts are incomplete and somewhat unreliable. The great dependence of X-ray absorption on the voltage applied to the tube, and on the thickness, density and atomic number of the specimen material makes it difficult to pick proper exposures, especially for sections of varying thickness and for alloy compositions for which complete calibration data are not available. The exposure meter of this invention makes it possible to determine the correct exposure time in X-ray radiography independently of all these variables. So far as is known no exposure meter suitable for use in radiography has existed heretofore.

This invention has for its principal objects the following:

To provide a reliable means for quickly and accurately determining the correct exposure time in radiography;

To provide such a means which will be substantially independent of the voltage of the radiation source;

To provide such a means which will indicate proper exposure without the necessity for recourse to time-consuming calculations;

To provide such a means which, upon being calibrated for use with one specimen material, will serve equally well for any material;

To provide such a means which will indicate proper exposure time for any geometry of radiograph set-up.

Other objects will become apparent from a careful consideration of the following description when taken together with the accompanying drawings in which:

Fig. 1 is an elevational view partly in section of a conventional form of Geiger-Müller counter;

Fig. 2 is an elevational view partially in section of a type of counter employed in the invention;

Fig. 3 is a perspective view of a multiple type of counter used in the invention, together with a shielded means therefor shown partially broken away, and Fig. 4 is a circuit diagram of the circuits employed in the invention.

The invention makes use of the Geiger-Müller counter, of which a conventional form is shown in Fig. 1, as a means for measuring the intensity of the radiation transmitted from the source through the inspection material. This type of counter is the most sensitive device now in use for the detection of penetrating radiations, but it has been used mainly heretofore for measuring the intensities of cosmic rays. In brief, it is a device which responds to individual electrified particles and to quanta of radiation. Its operation is based on a tremendous amplification of the charge of the original electrified particle or of the ions produced by a quantum of radiation. A typical counter as disclosed in Fig. 1 consists of an anode wire 10 surrounded by and insulated from a cylindrical cathode 11, both elements being enclosed in a glass tube 12. Normally the tube 12 is filled with gas to less than atmospheric pressure and a potential difference of the order of 1000 volts is applied as shown in the figure. When the counter is adjusted for operation, an electrical discharge between the wire and the cathode may be triggered by the entrance of a single X-ray or gamma-ray quantum. Each such discharge lasts a very short time but still produces about 1,000,000 electrons for the single ray that started it. These discharges are easily counted by electrical methods and the number per unit time is the measure of intensity of radiation entering the counter.

A suitable counter for use in a gamma-ray exposure meter is shown in Fig. 2. Since exposures in gamma-ray radiography are rather long, there is no objection in allowing even as much as a minute for the period of the exposure meter. This makes it possible to indicate even the weakest intensities, corresponding to exposure times as long as 300 hours, with a small tube counter. For exposures up to 50 hours the meter period could be conveniently reduced to 10 seconds. An advantage of using a small counter is the relatively small weight of lead shielding required to guard against scattered radiation. On a large counter considerable shielding is essential, making it so bulky and heavy that it becomes difficult to handle.

The counter shown in Fig. 2 has the same fundamental design as that of Fig. 1 but is mounted for convenience on a standard radio tube base. If desired, the glass envelope can be replaced by a metal tube. Connection to the electrical circuit is made with coaxial cable of sufficient length to provide easy manipulation.

The electrical circuit shown in Fig. 4 constitutes a frequency meter by means of which the intensity of the radiation passing through the counter may be indicated in terms of exposure time. All discharge pulses from the counter 13 are amplified to the same size by means of a multi-vibrator consisting of tubes $V_1$ and $V_2$. The output of the multi-vibrator is impressed upon the control grid of tube $V_3$ whose average direct current flow is then directly proportional to the number of pulses per unit time. The current is conveniently read by means of a microammeter 14 in series with the plate resistor $R_1$. To average out fluctuations of current due to randomness of counts, the meter and plate resistor are paralleled by a smoothing condenser $C_1$. The period of the exposure meter is determined by the size of this condenser. The high voltage for the counter 13 is derived from a power pack indicated generally by the reference character 15. Voltage from this source is passed through a conventional electronic voltage stabilizer of the degenerate stabilizer-controlled amplifier type indicated generally by the reference character 16 before being impressed upon the counter. Reference to such a device may be found in the Review of Scientific Instruments, volume 10, page 6, 1939. Voltage stabilization is necessary in order to secure uniform counter response, since the number of pulses per unit time varies slightly with voltage even when operating on the best portion of the characteristic curve of the counter.

Normally the tube $V_1$ of the multi-vibrator will be conducting while the tube $V_2$ will be non-conducting. If now a short negative pulse from the counter is applied to the grid of $V_1$ the plate potential of this tube will be increased impressing a positive pulse upon the grid of tube $V_2$ which will in turn increase the current flow in the plate circuit of this tube and reduce the plate potential. This will further reduce the grid potential of tube $V_1$ and this process will continue until the plate current of tube $V_2$ reaches a maximum limited by its plate resistance, with its plate potential at a low value. Simultaneously, the grid of tube $V_1$ has been forced to an extremely negative value slightly less than the plate supply voltage, which it maintains until the negative charge leaks from the grid to ground through resistor $R_3$. As the charge leaks off condenser $C_2$, the grid of tube $V_1$ goes less negative exponentially until it passes critical cut-off value. Tube $V_1$ then becomes conducting again and the grid of tube $V_2$ goes very negative cutting off the plate current. The grid of $V_2$ now recovers exponentially but because of the negative bias on this grid it does not reach the critical cut-off voltage. The minimum pulse size to which the multi-vibrator will respond is determined by the grid bias supplied to tube $V_2$.

The multi-vibrator also acts to quench quickly the counter pulse after a pulse has been received. This is accomplished by the negative pulse generated by tube $V_2$ as explained above. This pulse, added to the high voltage drop through resistance $R_2$, greatly speeds up the resolving time of the counter, thus increasing the number of counts which it can make in a unit of time.

In using this exposure meter, the radium source is mounted in position for a radiograph and the counter is brought up to film position. In gamma or X-ray radiography based upon the action of the radiation upon a film, the film position is conventionally and of necessity such that the radiation after penetrating the specimen will impinge upon it. Meter readings are proportional to transmitted intensity and the scale of the micrometer 14 may be calibrated to indicate directly the proper exposure time.

For use with X-ray radiography the counter shown in Fig. 3 is preferred. The amount of lead shielding needed to protect against scattered 200 kv. X-radiation is much less than that required for gamma rays. Therefore, for the X-ray exposure meter a larger Geiger-Müller counter may be used with a corresponding gain in sensitivity and speed. The counter shown in Fig. 4 consists of 10 small counter units connected in a parallel arrangement. The counter cylinders 17 are made of brass mesh and are mounted in a Duraluminum block 18 with a hole 19 one centimeter in diameter drilled down its axis. The efficiency of the unit depends upon the effective amount of cathode surface area struck by the radiation so that the use of 100 mesh brass gauze and 10 cylinders gives approximately 20 times the efficiency of a single tube type counter with a smooth walled cathode.

The anode wires 20 are conductively connected to and supported by metal supporting members 21 which are maintained in a fixed position relative to the Duraluminum block 18 by means of rods 22 of insulating material. A connection from the metal supporting members 21 to the outside of the tube is made by conductor 23. This assembly is enclosed in a glass tube 25. A lead shielding jacket 24 surrounds the tube.

In calibrating the gamma-ray exposure meter, a steel plate of a desired thickness may be used, meter readings being taken for a number of different radium source positions. By calculation, these readings may be transformed into exposure time units.

In calibrating the X-ray exposure meter, readings of the indicator 14 may be taken for a range of voltages commonly used and steel thicknesses commonly radiographed at these voltages. Curves may then be constructed from these data showing the relationship between thickness of steel and the meter reading. Having attained this relationship the meter reading may be calibrated by reference to standard X-ray technique charts for steel, in terms of the exposure necessary to produce a desired blackening of the film at a constant kilovoltage. This calibration will apply equally well to other materials. At higher voltages from 150 kilovolts up it will be found that the exposure meter readings as a function of density will have little dependence on voltage.

The use of the exposure meter of this invention results in several important advantages. The most important of these advantages may be summarized as follows:

While exposure meter readings are proportional to intensity, film blackening is proportional to the logarithm of intensity and the exposure meter therefore guarantees good density with a considerable latitude in its reading. With the X-ray exposure meter a reading almost anywhere on the scale is enough to assure fairly good film blackening.

In the neighborhood of 200 kilovolts a change of only 10 kilovolts requires a change of 150% in exposure time for a given density. The exposure meter reads correctly almost independently of voltage, whereas technique charts may be relied on only when the voltage is accurately known. It has been found that the tube voltage and current are often unreliable indications of the X-ray intensity produced by the tube.

The exposure meter need be calibrated for only one material and the calibration will apply to all materials.

The meter is read with the counter always at the film position and indicates proper exposure for any geometry of the radiographic set-up.

In radiographing castings of variable thickness the instrument makes it possible to determine the radiation passing through any section and to select a suitable mean value of intensity. The calibration of the meter then gives immediately the best combination of voltage and exposure time. Thus the loss of film and time involved in this type of radiograph, which has always been an important consideration, is eliminated. The gamma-ray meter opens up possibilities for short-lived sources such as radon and radio-yttrium, which at present are difficult to use because of the lack of knowledge of the extent to which the source has decayed. The X-ray exposure meter embodying the invention may be used with any of the high voltage X-ray equipment now coming into widespread use. Since only very meager technique chart data are available for these outfits, the exposure meter would be of great value in this connection, since it would render unnecessary the tedius work of calibration.

While only two embodiments of the invention have been disclosed, many changes in form and proportions coming within the scope of the invention will be apparent to those skilled in the art. It is to be understood, therefore, that the scope of the invention is not to be considered as limited to the embodiments disclosed but only by the scope of the appended claims.

The invention described herein may be manufactured and used by or for the Government of the United States of America for governmental purposes without the payment of any royalties thereon or therefor.

We claim:

1. An apparatus for determining the proper exposure time for use in radiographing a specimen, comprising, a source of radiation to be used in making the radiograph, said source being positioned in the position in which it will be used for that purpose, a Geiger-Müller counter positioned at the location at which the film will be placed in making the radiograph, means comprising a multivibrator for rapidly quenching the individual counter discharges, means for amplifying and clipping the voltage pulses corresponding to the individual counter discharges to produce a series of voltage pulses of substantially uniform magnitude corresponding in frequency to the discharge frequency of the Geiger-Müller tube, means producing a current flow proportional to the frequency of said voltage pulses and means to indicate the magnitude of said current flow.

2. An apparatus for determining the proper exposure time for use in radiographing a specimen, comprising, a source of radiation to be used in making the radiograph, said source being positioned in the position in which it will be used for that purpose, a Geiger-Müller counter positioned at the location at which the film will be placed in making the radiograph, a multivibrator, means applying the output of said counter to said multivibrator, an amplifying tube having a grid, means applying the output of said multivibrator to said grid and means indicating the magnitude of the current flow in the plate circuit of said amplifying tube.

3. An apparatus for determining the proper exposure time for use in radiographing a specimen, comprising, a source of radiation to be used in making the radiograph, said source being positioned in the position in which it will be used for that purpose, a Geiger-Müller counter positioned at the location at which the film will be placed in making the radiograph, a multivibrator comprising a pair of tubes having grids, means connecting the output of said counter to the grid of the first of said tubes and to the plate of the second, means impressing a high voltage on the anode of said counter and the plate of said second tube, the plate of said first tube being connected to the grid of the said second tube whereby the output of said counter will be impressed upon the grid of said first tube and will cause a positive voltage pulse to be impressed upon the grid of said second tube, thus producing a negative pulse in the plate circuit of said second tube which will rapidly quench said counter, an amplifier tube having a grid, means connecting said grid to the plate circuit of said first tube and means indicating the magnitude of the current flow in the plate circuit of said amplifier.

4. A radiographic exposure meter comprising a Geiger-Müller counter as a radiation detector adapted to be placed in substantially the film position in making a radiograph, a multivibrator adapted to receive the output of said Geiger-Müller counter and operate as a discharge quencher, pulse amplifier and pulse clipper to yield as its output a series of pulses of uniform amplitude, a pulse frequency counting circuit to receive the output of said multivibrator and give a flow of current proportional to the pulse frequency, and a current indicating device to indicate the magnitude of current flow in said pulse frequency counting circuit.

HERBERT FRIEDMAN.
ARTHUR L. CHRISTENSON.

CERTIFICATE OF CORRECTION.

Patent No. 2,383,478. August 28, 1945.

HERBERT FRIEDMAN, ET AL.

It is hereby certified that error appears in the printed specification of the above numbered patent requiring correction as follows: Page 2, second column, line 10, for "micrometer" read --microammeter--; and in the heading to the drawings, Sheets 1 and 2, name of inventor, for "FREIDMAN" read --FRIEDMAN--; and that the said Letters Patent should be read with this correction therein that the same may conform to the record of the case in the Patent Office.

Signed and sealed this 1st day of January, A. D. 1946.

Leslie Frazer (Seal) First Assistant Commissioner of Patents.